No. 897,063. PATENTED AUG. 25, 1908.
W. L. COOKSEY.
ROLLER BEARING TROLLEY WHEEL.
APPLICATION FILED AUG. 22, 1907.
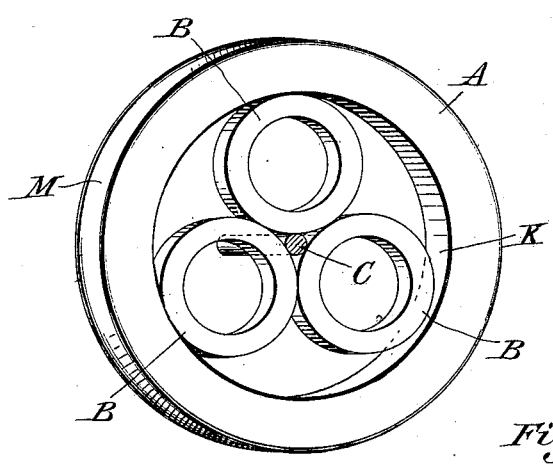
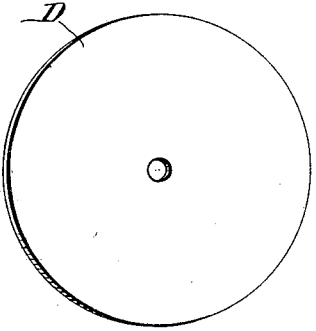
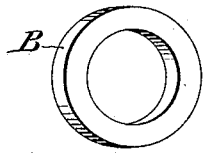
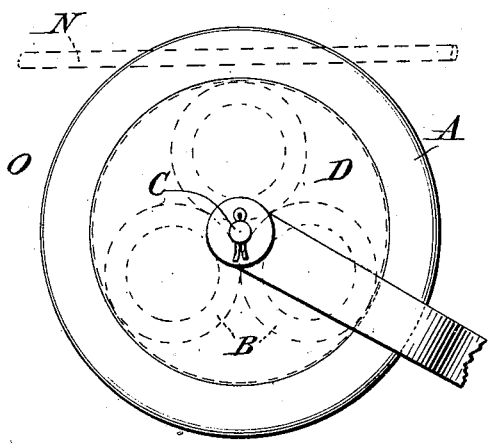
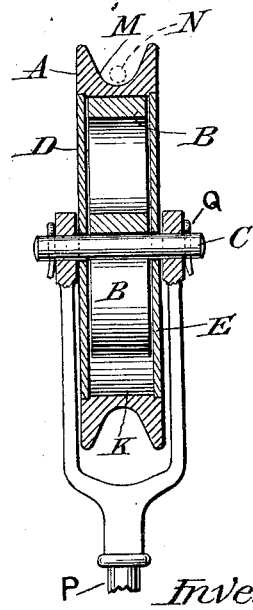
Witnesses:
Inventor.
W. L. Cooksey

UNITED STATES PATENT OFFICE.

WILLIAM LINCH COOKSEY, OF FORT WORTH, TEXAS.

ROLLER-BEARING TROLLEY-WHEEL.

No. 897,063.  Specification of Letters Patent.  Patented Aug. 25, 1908.

Application filed August 22, 1907. Serial No. 389,752.

*To all whom it may concern:*

Be it known that I, WILLIAM LINCH COOKSEY, a citizen of the United States, residing at Fort Worth, Texas, have invented a new and Improved Trolley-Wheel, of which the following is a specification.

The invention relates to improvements in trolley wheels for electric cars.

The object of the present invention is to improve the construction of trolley wheels for electric cars, and to provide a high speed roller bearing trolley wheel in which the speed of the moving parts at the center of the wheel will be reduced to a minimum to lessen the friction on the axle.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a roller bearing trolley wheel, constructed in accordance with this invention, the side plates being removed and the axle being in section. Fig. 2 is a side elevation of the trolley wheel, shown applied to a trolley pole. Fig. 3 is a transverse sectional view of the same. Fig. 4 is a detail perspective view of one of the side plates. Fig. 5 is a similar view of one of the rotary disk-shaped members or rollers.

Like letters of reference designate corresponding parts in all the figures of the drawing.

A designates a trolley wheel rim provided at its outer periphery with a groove M to receive a trolley wire N, as illustrated in dotted lines in Figs. 2 and 3 of the drawing, and having a smooth inner plain bearing face K which is engaged by three rotary disk-shaped members or rollers B, which are preferably in the form of rings to lighten the construction. The disk-shaped members or rollers, which are disposed in trefoil relation, fit against each other and against the inner bearing face of the trolley wheel rim and also against an axle C. The three rollers form a central space or opening for the axle, which fits against each of the rollers. The axle is maintained in a central position by the rollers, which form a rolling bearing for the axle, and a rolling support or bearing for the trolley wheel rim. The trefoil arrangement of the rollers within the trolley rim enables the largest size rollers and the smallest size axle or spindle to be employed, and the movement of the parts at the center of the wheel is thereby reduced to a minimum and the friction on the axle is lessened.

The rollers are retained within the trolley wheel rim by side plates D, provided with central openings for the axle and fitted within annular recesses of the trolley wheel rim, as clearly illustrated in Fig. 3 of the drawing, the outer face of the side plates and the side faces of the trolley wheel rim being in flush relation.

The trolley wheel is mounted in the bifurcated upper end of an ordinary trolley pole P, provided with bearings for the reception of the axle, which is equipped with keys Q, or other suitable fastening devices for retaining its ends in the bearing of the trolley pole.

What I claim is:—

1. In a high speed trolley wheel, the combination of a trolley wheel rim having a peripheral groove and provided with an inner bearing face, a relatively small axle, and three relatively large rollers disposed in trefoil relation and extending from the axle to the bearing face of the rim and fitting and rolling against the same and against each other.

2. In a high speed trolley wheel, the combination of a trolley wheel rim having a peripheral groove and provided with an inner bearing face, a relatively small axle, three relatively large ring-shaped rollers disposed in trefoil relation and extending from the relatively small axle to the inner bearing face of the rim and rolling against each other, against the inner bearing face of the rim and against the axle, and side plates mounted on the axle and closing the sides of the trolley wheel rim to retain the rollers therein.

In testimony whereof I set my hand in the presence of two witnesses this 23d day of July 1907.

WILLIAM LINCH COOKSEY.

Witnesses:
E. O. CHAMBERLIN,
W. F. WIGGIN.